United States Patent [19]
Yamakawa et al.

[11] Patent Number: 4,818,781
[45] Date of Patent: Apr. 4, 1989

[54] RESIN FOR MAGNETIC COATING

[75] Inventors: Masahiro Yamakawa, Takaoka; Toyoichi Arai, Himi; Kiyosi Nitta, Takaoka, all of Japan

[73] Assignee: Nippon Zeon Co., Ltd., Tokyo, Japan

[21] Appl. No.: 931,912

[22] Filed: Nov. 17, 1986

Related U.S. Application Data

[63] Continuation of Ser. No. 707,131, Mar. 1, 1985, abandoned.

[30] Foreign Application Priority Data

Mar. 3, 1984 [JP] Japan ................................. 59-41014
Mar. 30, 1984 [JP] Japan ................................. 59-62568

[51] Int. Cl.$^4$ ............................................... C08K 3/10
[52] U.S. Cl. ..................... 524/407; 524/431; 524/435; 524/440
[58] Field of Search ................ 524/407, 431, 435, 440

[56] References Cited

U.S. PATENT DOCUMENTS 4,205,161  5/1980  Wiest et al. ..................... 526/304
4,476,035 10/1984  Miyoshi et al. ................. 524/507

Primary Examiner—Joseph L. Schofer
Assistant Examiner—J. M. Reddick
Attorney, Agent, or Firm—Sherman and Shalloway

[57] ABSTRACT

A resin for magnetic coating, which is a copolymer composed of
(1) at least 60% by weight of vinyl chloride units,
(2) 0.3 to 5.0% by weight, as the carboxyl group, of monomer units containing a carboxyl group,
(3) 0.1 to 2.0% by weight, as the hydroxyl group, of monomer units containing the group —X—OH wherein X is an organic group, and
(4) up to 20% by weight of units of another monomer, the equivalent ratio of the hydroxyl groups to the carboxyl groups being from 0.1 to 3.0.

10 Claims, No Drawings

RESIN FOR MAGNETIC COATING

This application is a continuation of application Ser. No. 707,131 filed Mar. 1, 1985, now abandoned.

This invention relates to a vinyl chloride resin (to be referred to as PVC hereinafter) for magnetic coating, and particularly to PVC for use as a binder for magnetic recording media.

Generally, magnetic recording media such as magnetic tapes or floppy discs are produced by coating magnetic coating compositions comprising ferromagnetic powders dispersed in organic solvents on polymeric films or sheets. Many organic polymers used in such magnetic coating compositions are a combination of a relatively hard resin such as PVC, polyvinyl butyral, nicrocellulose and acetylcellulose and soft material such as polyesters, polyurethane and an acrylonitrile/butadiene copolymer. Frequently, polyisocyanate compounds are used as a heat curing component to improve the durability of the resulting coatings. Accordingly, binder resins are required not only to have suitable compatibility with other polymers or suitable reactivity with polyisocyanates, but also to have good affinity for magnetic powders and disperse them uniformly in the coating composition.

With the recent demand for higher recording densities and lower S/N ratios of magnetic recording media, the magnetic powders have become finer in particle size and higher in coercivity. Hence, the dispersing ability of the binder is a decisively important factor in dispersing the magnetic powders uniformly in the coating composition, forming a smooth and highly packed magnetic layer, and to improve the properties of the recording media.

Previously, the dispersion of the magnetic powder has been improved usually by using a low-molecular-weight surface-active agent as a dispersant. The amount of the dispersing agent, however, is naturally limited in view of the durability, head contamination, etc. of the magnetic recording medium. Furthermore, the binder itself is required to have a high dispersing ability in order to improve the reliability of the magnetic recording medium. On the other hand, to increase the durability and reliability of the recording medium, it is common practice, particularly in making magnetic videotapes, to include a curable compound typified by a polyisocyanate compound into the magnetic coating composition and curing the resulting magnetic layer. Hence, the binder is required to have proper reactivity with the polyisocyanates. If it has too high reactivity, the resulting coating composition has a short pot life and this is uneconomical. If it is too low, no expected increase is obtained in durability or running property.

Typical known PVC binders include, for example, a vinyl chloride/vinyl alcohol/vinyl acetate copolymer and a vinyl chloride/maleic acid/vinyl acetate copolymer. The former has a higher ability to disperse the magnetic powder as the proportion of vinyl alcohol becomes higher. The extent of this improvement, however, is low, and the aid of a dispersant is required. In addition, with an increase in the amount of vinyl alcohol, the pot life becomes shorter and the coated film has reduced moisture resistance. Furthermore, the rate of thermal decomposition of the coated film increases. On the other hand, the latter adsorbs strongly to the magnetic powder and exhibits superior dispersing ability. However, the coating composition is liable to gel and increase in viscosity. Furthermore, it tends to react with the polyisocyanate locally.

In an attempt to solve the aforesaid problems of these typical PVC binders, a vinyl chloride/vinyl alcohol/vinyl acetate/maleic acid copolymer was proposed (Japanese Laid-Open Patent Publication No. 114330/1983). This copolymer has in combination the reactivity of the vinyl chloride/vinyl alcohol/vinyl acetate copolymer and the good dispersibilty of the vinyl chloride/maleic acid/vinyl acetate copolymer, but the level of this combination of the two properties is still insufficient. This copolymer is obtained usually by saponifying vinyl chloride/maleic acid/vinyl acetate copolymer. Because the copolymer undergoes degradation during saponification, the resulting product has poor chemical heat stability.

An another attempt, the use of a vinyl chloride/hydroxyethyl acrylate/acrylic acid copolymer was proposed (Japanese Laid-Open Patent Publication No. 77930/1981). If hydroxyethyl acrylate is used in a relatively large amount in producing this copolymer in order to obtain good solubility in solvents, the pot life of the copolymer dispersion becomes short upon addition of a polyisocyanate compound. On the other hand, if the amount of hydroxyethyl acrylate is decreased to an extent which leads to a suitable pot life, the resulting copolymer has reduced solubility in solvents, and the solution tends to gel and increase in viscosity.

It is an object of this invention to offer a solution to the aforesaid problems of conventional PVC resins containing alcoholic hydroxyl groups.

The present inventors have made investigations in order to achieve this object, and found that a multicomponent vinyl chloride copolymer containing specific amounts of carboxyl groups and specific hydroxyl groups exhibits a higher ability to disperse magnetic powders than expected, and has good reactivity with polyisocyanates despite its very low hydroxyl group content, and excellent chemical and heat stability, and that a magnetic recording medium obtained by coating a magnetic coating composition comprising this copolymer as a binder and a polyisocyanate as a curing agent on a polyester film shows excellent magnetic characteristics, electromagnetic converting characteristics and durability.

Thus, according to this invention, there is provided a resin for magnetic coating, which is a copolymer composed of (1) at least 60% by weight of vinyl chloride units,
(2) 0.3 to 5.0% by weight, as the carboxyl group, of monomer units containing a carboxyl group,
(3) 0.1 to 2.0% by weight, as the hydroxyl group, of monomer units containing the group —X—OH wherein X is an organic group, and
(4) up to 20% by weight of units of another monomer, the equivalent ratio of the hydroxyl groups to the carboxyl groups being from 0.1 to 3.0.

Examples of monomers (2') containing a carboxyl group used to give the carboxyl groups to the copolymer in this invention include unsaturated mono- or dicarboxylic acids such as acrylic acid, methacrylic acid, maleic acid, itaconic acid and crotonic acid; and monoalkyl esters of unsaturated dicarboxylic acids such as maleic acid and itaconic acid.

Monomers (3') containing the group —X—OH used to give the hydroxyl groups to the copolymer are, for example, those in which X is an organic group typified by $C_nH_{2n}$, $OC_nH_{2n}$, $COOC_nH_{2n}$ and $CONHC_nH_{2n}$ wherein n is an integer of at least 1, especially 1 to 10. Specific examples include $C_2$-$C_{10}$ alkanol esters of alpha,betaunsaturated acids such as 2-hydroxyethyl (meth)acrylate, 2-hydroxypropyl (meth)acrylate and 2-hydroxybutyl (meth) acrylate; alkanol esters of unsaturated dicarboxylic acids such as mono-2-hydroxypropyl maleate, di-2-hydroxypropyl maleate and mono-2-hydroxybutyl itaconate; olefinic alcohols such as 3-buten-1-ol, 5-hexen-1-ol, 4-penten-2-ol and 1-hexen-3-ol; alkanol vinyl ethers such as 2-hydroxyethyl vinyl ether and 2-hydroxypropyl vinyl ether; and (meth)acrylamides such as N-methylolacrylamide and N-methylolmethacrylamide.

The use of monomers (3') containing OH attached to the secondary carbon atom (the carbon atom to which one hydrogen is bonded) of the organic group X is preferred because it brings about especially good solubility in solvents and a particularly long pot life in the presence of a curing agent.

Examples of other copolymerizable monomers (4') used in this invention include vinyl esters of carboxylic acids such as vinyl acetate and vinylpropionate; vinyl ethers such as methyl vinyl ether, isobutyl vinyl ether and cetyl vinyl ether; vinylidene halides such as vinylidene chloride and vinylidene fluoride; unsaturated carboxylic acid esters such as diethyl maleate, butylbenzyl maleate, dimethyl itaconate, methyl (meth)acrylate, ethyl (meth)acrylate and lauryl (meth)acrylate; olefins such as ethylene and propylene; unsaturated nitriles such as (meth)acrylonitrile; and aromatic vinyl compounds such as styrene, alpha-methylstyrene and p-methylstyrene. These monomers are properly selected according to the purpose of adjusting the compatibility and softening points of the resin of this invention and another resin to be used as a mixture with it and increasing the solubility of the resins, and also according to the necessity for improving the properties of the coated film or the coating process.

The carboxyl groups and hydroxyl groups in the resin of this invention may also be introduced, for example, by using an unsaturated carboxylic acid anhydride and a glycol instead of the monomers (2') containing carboxyl groups and the monomers (3') containing the group—X—OH, and thus foming an alkanol ester of the unsaturated carboxylic acid during the copolymerization reaction.

The resin of this invention can be produced by using any of known methods. From the standpoint of the solubility of the resulting polymer, it is preferably produced by a solution polymerization technique, or a suspension polymerization technique using a lower alcohol such as methanol or ethanol either singly or with deionized water or a polymerization medium. Polymerization initiators used in the production of the resin include organic peroxides such as lauroyl peroxide, benzoyl peroxide, 3,5,5-trimethylhexanoyl peroxide, diisopropyl peroxydicarbonate, di-2-ethylhexyl peroxydicarbonate, di-2-ethoxyethyl peroxydicarbonate, 1-butyl peroxypivalate and 1-butyl peroxyneodecanoate; azo compounds such as 2,2'-azobisisobutyronitrile, 2,2'-azobis-2,4-dimethylvaleronitrile and 4,4'-azobis-4-cyanovaleric acid; and inorganic peroxides such as potassium persulfate, ammonium persulfate and ammonium perphosphate.

Suspension stabilizers used in the production of the resin of this invention include synthetic polymeric materials such as polyvinyl alcohol, partially saponified polyvinyl acetate, cellulose derivatives, (e.g., methyl cellulose, hydroxypropyl cellulose and carboxymethyl cellulose), polyvinyl pyrrolidone, polyacrylamide, maleic acid/styrene copolymer, maleic acid/methyl vinyl ether copolymer and maleic acid/vinyl acetate copolymer; and natual polymeric materials such as starch and gelatin. Useful emulsifiers include anionic emulsifiers such as sodium alkylbenzenesulfonates and sodium laurylsulfate, and nonionic emulsifiers such as polyoxyethylene alkyl ethers and partial esters of polyoxyethylene sorbitan fatty acids. As required, molecular weight controlling agents such as trichloroethylene and thioglycol may be used. The monomers, suspending agent, emulsifier, molecular weight controlling agent, etc. may be added to the polymerization system all at the start of the polymerization, or portionwise during the polymerization. The polymerization is carried out usually at a temperature of 35° to 80° C. with stirring.

The content of the vinyl chloride units (1) in the copolymer resin of this invention is at least 60% by weight. If it is less than 60% by weight, the resin has reduced compatibility with a flexible material, or the separation of the solvent from the coated film becomes very poor to cause troubles.

The content of the carboxyl group-containing monomer units (2) in the copolymer resin is 0.3 to 5.0% by weight as the carboxyl groups. Preferably, it is 0.5 to 4.0% by weight. If it is less than 0.3% by weight, the copolymer resin has an insufficient ability to disperse a magnetic powder. If it exceeds 5.0% by weight, a coating composition comprising the copolymer resin tends to gel and increase in viscosity.

The content of the monomer units (3) containing the group —X—OH in the copolymer resin is 0.1 to 2.0% by weight as the hydroxyl group. If it is less than 0.1% by weight, the crosslinking effect of the coated film by the isocyanate compound is not produced. If it is less than 2.0% by weight, the resulting coating composition has too short a pot life and is difficult to use. The amount of the hydroxyl group is far smaller than that of a vinyl chloride/vinyl alcohol/vinyl acetate copolymer known heretofore for use in magnetic coating. Despite this, the copolymer resin of this invention sufficiently performs a crosslinking reaction with the isocyanate compound. Although no clear reason can be assigned to it, it is presumed that the hydroxyl groups which participate in the reaction are located remote from the main chain of the copolymer and therefore has an increased degree of freedom, and the distribution of the hydroxyl groups in the copolymer is uniform.

It is essential that the equivalent ratio of the hydroxyl groups to the carboxyl groups should be from 0.1 to 3.0. If this ratio exceeds 3.0, the ability of the copolymer resins to disperse a magnetic powder is remarkably reduced. If it is less than 0.1, there is no effect of adding the group —X—OH.

The content of the other monomer units (4) in the copolymer resin is up to 20% by weight, preferably 1 to 15% by weight. If this content exceeds 20% by weight, the separation of the solvent from the coating composition upon coating becomes poor and the copolymer also has a lower softening point. This tends to reduce the heat-resistant running property of the resulting magnetic recording medium.

When OH is attached to the secondary carbon atom of the organic group X in the group -X-OH, the inclusion of the other monomer units (4) is not necessary. Otherwise, the absence of the other monomer units (4)

leads to the poor solvent solubility of the resulting copolymer resin.

The copolymer resin has a degree of polymerization of 200 to 900, preferably 250 to 500. If it is less than 200, the resulting magnetic layer has insufficient abrasion resistance. If it exceeds 900, the resulting coating composition has a high viscosity and tends to have the insufficient ability to disperse a magnetic powder.

The resin of this invention so obtained is prepared as a solvent solution, and used as such, together with an ordinary flexible material such as a polyurethane resin, a polyester resin or an acrylonitrile/butadiene copolymer, a crosslinking agent typified by a polyisocyanate compound, and a magnetic powder and optionally together with known materials such as a lubricant, a dispersing agent, an antistatic agent and a polishing and grinding agent, as in the case of ordinary vinyl chloride resin binders for magnetic coating.

The polyurethane resin is most typical as the flexible material. Specific examples of the polyurethane resin are polyurethane resins obtained by the reaction of polyester polyols or polyether polyols with isocyanates, preferably those which have residual hydroxyl groups.

Powders of metals such as Fe and Co are preferably used as the magnetic powder. There can also be used powders of gamma-$Fe_2O_3$, $Fe_3O_4$, Co-containing gamma-$Fe_2O_3$, Co-containing $Fe_3O_4$, barium ferrite, and $CrO_2$.

As desired, it is also possible to use ordinary resin binders for magnetic coating in amounts which can achieve the objective of this invention. Such binders include, for example, a vinyl chloride/vinyl acetate copolymer, a vinyl chloride/vinyl alcohol/vinyl acetate copolymer, a cellulosic resin, a phenoxy resin, an amino resin, an epoxy resin, a butyral resin and an acrylic resin.

Since the resin of this invention contains the group -X-OH in place of hydroxyl groups derived from the saponification of vinyl acetate units as in conventional resins, its reactivity with isocyanates can be greatly increased, and consequently the amount of the required hydroxyl groups can be drastically decreased. When the hydroxyl group in the group —X—OH is bonded to the secondary carbon atom of X, the resin of this invention can maintain both a long pot life and a good solubility in solvents.

The following examples illustrate the present invention more specifically. All parts in these examples are by weight.

EXAMPLE 1

An autoclave was charged with 100 parts of vinyl chloride, 10 parts of 3-buten-1-ol, 180 parts of acetone and 2 parts of benzoyl peroxide, and after deaeration, polymerization of the monomers was started at 50 °C. Immediately then, a thorough mixture of 5 parts of maleic anhydride, 5 parts of vinylidene chloride and 40 parts of methanol was continuously introduced into the autoclave. When the reaction pressure reached 1 kg/cm$^2$, the unreacted vinyl chloride was recovered, and 250 parts of water was added to the residue. The mixture was heated to 70° C., and the resulting copolymer was separated from the solvent and dried to obtain a copolymer A.

EXAMPLE 2

An autoclave was charged with 100 parts of vinyl chloride, 10 parts of isobutyl vinyl ether, 180 parts of acetone and 2 parts of benzoyl peroxide, and after deaeration, polymerization of the monomers was started at 55° C. Immediately then, a mixture of 4.5 parts of acrylic acid, 1.5 parts of water and 44 parts of methanol and a mixture of 5 parts of 2-hydroxyethyl methacrylate and 45 parts of methanol were continuously introduced into the autoclave from separate feed openings until the pressure of the autoclave reached 2.0 kg/cm2. When the reaction pressure reached 1.0 kg/cm2, the unreacted vinyl chloride was recovered, and 250 parts of deionized water was added. The mixture was heated, and the copolymer was separated from the solvent and dried to obtain a copolymer B.

EXAMPLE 3

An autoclave was charged with 100 parts of vinyl chloride, 18 parts of vinyl acetate, 3 parts of itaconic acid, 180 parts of methanol, 60 parts of deionized water, 0.6 part, of methyl cellulose, 0.2 part of polyoxyethylene sorbitan fatty acid ester, 0.35 part of trichloroethylene and 0.42 part of 2,2,5-trimethylhexanoyl peroxide, and after deaeration, polymerization of the monomers was started at 58° C. A mixture of 3 parts of 2-hydroxyethyl methacrylate and 20 parts of methanol was continuously introduced into the autoclave until the pressure of the autoclave reached 5 kg/cm$^2$. Then, the unreacted vinyl chloride was recovered when the pressure of the autoclave reached 3 kg/cm$^2$. The liquid was removed, and the residue was washed with cold water, and then dried to obtain a copolymer C.

EXAMPLE 4

An autoclave was charged with 100 parts of vinyl chloride, 14 parts of vinyl acetate, 4 parts of 2-hydroxyethyl vinyl ether, 6 parts of diethyl maleate, 3 parts of itaconic acid, 120 parts of methanol, 120 parts of deionized water, 0.6 part of methyl cellulose, 0.2 part of sodium lauryl sulfate, 0.05 part of 2-mercaptoethanol and 0.70 part of lauroyl peroxide. After deaeration, polymerization of the monomers was started. When the pressure reached 3 kg/cm$^2$, a solution of 0.05 part of bisphenol A in 0.2 part of methanol was added, and the unreacted vinyl chloride was recovered. The liquid was removed, and the residue was washed with cold water and dried to obtain a copolymer D.

EXAMPLE 5

Two parts of maleic anhydride and 100 parts of vinyl chloride were put in a deaerated autoclave, and mixed with stirring at room temperature. Twenty parts of propylene glycol was added and mixed at 58° C. for 4 hours. To the mixture were added 10 parts of vinyl acetate, 0.5 part of 3,5,5-trimethylehexanoyl peroxide, 0.6 part of methyl cellulose, 0.2 part of polyoxyethylene sorbitan fatty acid ester, 150 parts of methanol and 50 parts of deionized water, and polymerization of the monomers was started. When the pressure of the autoclave reached 3 kg/cm$^2$, the unreacted vinyl chloride was recovered. The liquid was removed, and the residue was washed with water and dried to obtain a copolymer E.

EXAMPLE 6

An autoclave was charged with 100 parts of vinyl chloride, 11 parts of vinyl acetate, 4 parts of itaconic acid, 180 parts of methanol, 60 parts of deionized water, 0.6 part of methyl cellulose, 0.2 part of polyoxyethylene sorbitan fatty acid ester, 0.33 part of trichloroethylene and 0.42 part of 3,3,5-trimethylhexanoyl peroxide. After deaeration, polymerization of the monomers was started at 58° C., and a mixture of 3 parts of N-methylolacrylamide and 20 parts of methanol was continuously introduced into an autoclave until the pressure of the autoclave reached 5 kg/cm². Thereafter, the unreacted vinyl chloride was recovered when the pressure of the autoclave reached 3 kg/cm². The liquid was removed, and the residue was washed with cold water, and dried to obtain a copolymer F.

COMPARATIVE EXAMPLE 1

A copolymer G was obtained in the same way as in Example 2 except that isobutyl vinyl ether was not used.

COMPARATIVE EXAMPLE 2

A copolymer H was obtained in the same way as in Example 2 except that the amount of 2-hydroxyethyl methacrylate was changed to 20 parts, and isobutyl vinyl ether was not used.

COMPARATIVE EXAMPLE 3

The same polymerization as in Example 3 was repeated except that the amount of itaconic acid was changed to 15 parts. The pressure of the autoclave decreased only to 6.5 kg/cm² after the lapse of 25 hours from the starting of the polymerization. The reaction was terminated at this point, and the polymer was recovered and dried to obtain a copolymer J.

COMPARATIVE EXAMPLE 5

A copolymer K was obained in the same way as in Example 3 except that the amount of trichloroethylene was changed to 1.0 part and the deionized water was not used.

COMPARATIVE EXAMPLE 6

A copolymer L was obtained in the same way as in Example 3 except that trichloroethylene and methanol were not used, and the amount of deionized water was changed to 240 parts.

COMPARATIVE EXAMPLE 7

An autoclave was charged with 50 parts of vinyl chloride, 20 parts of vinyl acetate, 180 parts of acetone and 2 parts of benzoyl peroxide. After deaeration, polymerization of the monomers was started at 55° C. Every time the pressure of the autoclave decreased by 0.5 kg/cm², 10 parts of vinyl chloride was addded. In this way, 50 parts in total of vinyl chloride was introduced into the autoclave. In the meantime, since the starting of the polymerization, 5 parts of maleic anhydride and 45 parts of methanol were continuously introduced into the autoclave, and when the pressure of the autoclave reached 1 kg/cm², the unreacted vinyl chloride was recovered. The reaction mixture was added to a mixture of 1000 parts of methanol and 6 parts of 65% nitric acid, and the mixture was stirred at 70° C. for 12 hours. Furthermore, 1000 parts of deionized water was added, and the copolymer was separated and recovered from the medium. Then, 500 parts of acetone and the copolymer were mixed with stirring at 60° C., and 1000 parts of methanol was added. The copolymer was separated, washed with water, and dried to obtain a copolymer M.

The compositions of the copolymers obtained in the foregoing examples are summarized in Table 1 together with those of commercially available vinyl chloride/vinyl acetate/maleic acid terpolymer (N) and vinyl chloride/vinyl acetate/vinyl alcohol copolymer (O). The content (%) of the carboxyl group was determined by titration, and the content (%) of the hydroxyl group, by infrared spectroscopy.

These resins were also tested in the form of magnetic coating compositions and magnetic recording media by the following methods of evaluation. The results are also shown in Table 1.

(1) Solubility

One hundred parts of the vinyl chloride copolymer was added to a mixture composed of 200 parts of methyl ethyl ketone, 100 parts of methyl isobutyl ketone and 100 parts of toluene, and the mixture was stirred at 65° C. for 1 hours. Then, the degree of transparency of the solution was visually observed, and evaluated on a scale of three grades where O means excellent, Δ means good and X means poor.

(2) Pot Life

Twenty parts, per 100 parts of the vinyl chloride copolymer, of a polyisocyanate (Coronate L, a product of Nippon Polyurethane Industry Co., Ltd.) was added to the solution used in the solubility test 1). The mixture was stored at 23° C. The time which elapsed until the solution did not flow even when the container was turned upside down was mesured, and defined as the pot life (generally, the desirable pot life is 7 to 30 days).

(3) Heat stability

The solution used in the solubility test 1) was cast onto a glass plate maintained horizontal by a level to form a sheet having a thickness of 0.2 mm. The sheet was heated in a Geer's oven at 120° C., and the time which elapsed until it was blackened was measured.

(4) Gloss

A mixture composed of 400 parts of a cobalt-doped magnetic iron oxide powder (specific surface area 30 m²/g), 60 parts of the vinyl chloride copolymer, 40 parts of a polyurethane resin (Nippolane 2304, a product of Nippon Polyurethane Industry, Co., Ltd.), 300 parts of methyl ethyl ketone, 300 parts of methyl isobutyl ketone, 300 part of toluene and 4 parts of lecithin was dispersed under high-speed shear for 90 minutes. Then, 15 parts of a polyisocyanate (Coronate L, a product of Nippon Polyurethane Industry, Co., Ltd.) was added, and the mixture was further dispersed for 15 minutes to form a magnetic coating composition. The magnetic coating composition was coated on a polyester film to a film thickness of 5 micrometers, subjected to a magnetic field orientation treatment, and dried. The reflectance of the magnetic coating at a reflection angle of 60 was measured by a glossmeter.

(5) Squareness ratio

A 12.5 mm×50 mm sample cut out from the magnetic coating obtained in the evaluation of gloss was used, and its squareness ratio (Br/Bm) was measured by a magnetic characteristic measuring device.

(6) Durability

The magnetic coating used in the evaluation of gloss was smoothened by a calender roll, heat-treated at 65° C. for 65 hours, and then under a load of 100 g, brought into contact with a rotating drum to which abrasive paper was attached. The drum was rotated at a speed of 150 rpm, the degree of adhesion of the magnetic coating to the abrasive paper was observed visually, and evaluated on a scale of three grades where O means excellent, Δ means good and X means poor.

(7) Running property

The force generated between the coating and the rotating drum during the evaluation of durability was measured by a U gauge in an atmosphere kept at a temperature of 65° C. and a relative humidity of 80%. The running property was evaluated on a scale of three grades by the running resistance which is low (O), medium (Δ) and high (X).

unreacted vinyl chloride was recovered. Deionized water (250 parts) was added, and the mixture was warmed. The polymer was separated from the solvent and dried to obtain a copolymer O.

EXAMPLE 9

An autoclave was charged with 100 parts of vinyl chloride, 3 parts of itaconic acid, 180 parts of methanol, 60 parts of deionized water, 0.6 parts of methyl cellulose, 0.2 part of polyoxyethylene sorbitan fatty acid ester, 0.35 part of trichloroethylene and 0.42 part of 3,3,5-trimethylhexanoyl peroxide. After deaeration, polymerization of the monomers was started at 58° C.,

TABLE 1

| | Example | | | | | | Comparative Example | | | | | | | | |
|---|---|---|---|---|---|---|---|---|---|---|---|---|---|---|---|
| Sample | 1 A | 2 B | 3 C | 4 D | 5 E | 6 F | 1 G | 2 H | 3 I | 4 J | 5 K | 6 L | 7 M | 8 N | 9 O |
| Properties of the copolymer | | | | | | | | | | | | | | | |
| Composition (wt. %) | | | | | | | | | | | | | | | |
| Vinyl chloride | 85.9 | 86.2 | 84.5 | 81.8 | 88.0 | 87.1 | 91.7 | 76.5 | 68.5 | 74.2 | 84.5 | 84.5 | 87.5 | 86.0 | 91.0 |
| Carboxyl group | 1.8 | 2.5 | 1.5 | 0.9 | 1.5 | 1.7 | 2.3 | 4.0 | 6.5 | 1.5 | 1.5 | 0.7 | 1.5 | 0.8 | — |
| Hydroxyl group | 1.2 | 0.5 | 0.3 | 0.4 | 0.5 | 0.4 | 0.6 | 2.3 | 1.0 | 1.8 | 0.4 | 0.2 | *2 1.6 | — | *2 2.3 |
| Other comonomer*1 | $a$6.6 | $b$5.6 | $c$11.0 | $c$8.7 $d$4.8 | $c$7.2 | $c$7.5 | — | — | $c$14.3 | $c$9.7 | $c$10.1 | $c$13.0 | $c$5.2 | $c$13.0 | $c$3 |
| Equivalent ratio of hydroxyl group to carboxyl group | 1.76 | 0.53 | 0.53 | 1.18 | 0.88 | 0.62 | 0.69 | 1.52 | 0.40 | 3.18 | 0.71 | 0.76 | 2.8 | — | — |
| Degree of polymerization | 330 | 360 | 390 | 440 | 420 | 430 | 570 | 530 | 210 | 310 | 170 | 950 | 420 | 430 | 450 |
| Properties of the magnetic coating composition or magnetic recording medium | | | | | | | | | | | | | | | |
| Solubility | O | O | O | O | O | O | *3 Δ | Δ | Δ | O | O | *3 Δ | O | O | O |
| Pot life (days) | 12 | 20 | 24 | 21 | 24 | 20 | — | 1 | 4 | 3 | 25 | — | 26 | >30 | 20 |
| Heat stability (hours) | 8 | 15 | 12 | 13 | 10 | 10 | 12 | 6 | 6 | 10 | 7 | 14 | 2 | 8 | 3 |
| Gloss (%) | 81 | 87 | 91 | 86 | 83 | 85 | 71 | 60 | 82 | 68 | 94 | No coating composition could be prepared. | 72 | 68 | 52 |
| Squareness ratio | 0.80 | 0.83 | 0.84 | 0.83 | 0.82 | 0.83 | 0.78 | 0.77 | 0.80 | 0.78 | 0.84 | | 0.78 | 0.77 | 0.77 |
| Durability | O | O | O | O | O | O | O | O | Δ | Δ | X | | O | Δ | X |
| Running property | O | O | O | O | O | O | O | O | X | Δ | X | | Δ | X | O |

*1: $a$Vinylidene chloride,
$b$isobutyl vinyl ether,
$c$vinyl acetate,
$d$diethyl maleate
*2: Vinyl alcohol
*3: Dissolves under heat, but gels upon cooling

EXAMPLE 7

An autoclave was charged with 100 parts of vinyl chloride, 25 parts of 1-hexen-3-ol, 180 parts of acetone and 2 parts of benzoyl peroxide. After deaeration, polymerization of the monomers was started at 50° C. Immediately then, a thorough mixture of 5 parts of maleic anhydride and 40 parts of methanol was continuously introduced into the autoclave. When the reaction pressure reached 1 kg/cm², the unreacted vinyl chloride was recovered, and 250 parts of water was added to the residue. The mixture was warmed to 70° C. The polymer was separated from the solvent, and dried to obtain a copolymer P.

EXAMPLE 8

An autoclave was charged with 100 parts of vinyl chloride, 180 parts of acetone and 2 parts of benzoyl peroxide. After deaeration, polymerization of the monomers was started at 55° C. Immmediately then, a mixture of 4.5 parts of acrylic acid, 1.5 parts of water and 44 parts of methanol, and a mixture of 15 parts of 2-hydroxybutyl methacrylate and 45 parts of methanol were continuously introduced from separate feed openings until the pressure of the autoclave reached 2.0 kg/cm². When the pressure reached 1.0 kg/cm², the and a mixture of 10 parts of 2-hydroxypropyl methacrylate and 20 parts of methanol was continuously introduced into the autoclave. The introduction of the mixture was terminated before the pressure of the autoclave reached 5 kg/cm². Then, when the pressure of the autoclave reached 3 kg/cm², the unreacted vinyl chloride was recovered. The liquid was removed, and the residue was washed with cold water, and dried to obtain a copolymer R.

EXAMPLE 10

An autoclave was charged with 100 parts of vinyl chloride, 5 parts of vinyl acetate, 8 parts of 2-hydroxypropyl vinyl ether, 3 parts of itaconic acid, 120 parts of methanol, 120 parts of deionized water, 0.6 part of methyl cellulose, 0.2 part of sodium lauryl sulfate, 0.05 part of 2-mercaptoethanol and 0.70 part of lauroyl peroxide. After deareation, polymerization of the monomers was started at 60° C. When the pressure reached 3 kg/cm², a solution of 0.05 part of bisphenol A in 0.2 part of methanol was added, and the unreacted vinyl chloride was recovered. The liquid was removed, and the residue was washed with cold water, and dried to obtain a copolymer S.

EXAMPLE 11

Maleic anhydride (5 parts) and 100 parts of vinyl chloride were put in a deaerated autoclave, and mixed with stirring at room temperature. Then, 20 parts of propylene glycol was added, and mixed at 58° C. for 10 hours. To the mixture were added 0.5 part of 3,5,5-trimethylhexanoyl peroxide, 0.6 part of methyl cellulose, 0.2 part of polyoxyethylene sorbitan fatty acid ester, 150 parts of methanol and 50 parts of deionized water. Polymerization of the monomers was started, and when the pressure of the autoclave reached 3 kg/cm$^2$, the unreacted vinyl chloride was recovered. The liquid was removed, and the residue was washed with water and dried to obtain a copolymer T.

COMPARATIVE EXAMPLE 10

A copolymer U was obtained in the same way as in Example 8 except that 2-hydroxyethyl methacrylate was used instead of 2-hydroxybutyl methacrylate.

COMPARATIVE EXAMPLE 11

A copolymer V was obtained in the same way as in Example 8 except that the amount of 2-hydroxybutyl methacrylate was changed to 30 parts.

COMPARATIVE EXAMPLE 12

The same polymerization as in Example 9 was carried out except that the amount of itaconic cid used was changed to 15 parts. The pressure of the autoclave decreased only to 6.5 kg/cm$^2$ after the lapse of 25 hours from the starting of the polymerization. The reaction was terminated at this point, and the polymer was recovered and dried to obtain a copolymer W.

COMPARATIVE EXAMPLE 13

A copolymer X was obtained in the same way as in Example 9 except that the amount of hydroxypropyl methacrylate used was changed to 20 parts.

COMPARATIVE EXAMPLE 14

A copolymer Y was obtained in the same way as in Example 9 except that the amount of trichloroethylene used was changed to 1.0 part, and deionized water was not used.

COMPARATIVE EXAMPLE 15

A copolymer Z was obtained in the same way as in Example 9 except that trichloroethylene and methanol were not used, and the amount of deionized water used was changed to 240 parts.

COMPARATIVE EXAMPLE 16

An autoclave was charged with 50 parts of vinyl chloride, 14 parts of vinyl acetate, 180 parts of acetone and 2 parts of benzoyl peroxide. After deaeration, polymerization of the monomers was started at 55° C. Every time the pressure of the autoclave decreased by 0.5 kg/cm$^2$, 10 parts of vinyl chloride was added. In this way, 50 parts in total of vinyl chloride was introduced into the autoclave. In the meantime, since the starting of the polymerization, 10 parts of maleic anhydride and 45 parts of methanol were continuously introduced into the autoclave, and when the pressure of the autoclave reached 1 kg/cm$^2$, the unreacted vinyl chloride was recovered. The reaction mixture was added to a mixture of 1000 parts of methanol and 6 parts of 65% nitric acid, and the mixture was stirred at 80° C. for 12 hours. Furthermore, 1000 parts of deionized water was added and the copolymer was separated and recovered from the medium. Then, 500 parts of acetone and the copolymer were mixed with stirring at 60° C., and 1000 parts of methanol was added. The copolymer was separated, washed with water, and dried to obtain a copolymer a.

The compositions of the copolymers obtained in Examples 7 to 11 and Comparative Examples 10 to 16 are shown in Table 2. The carboxyl group content (%) was determined by titration, and the hydroxyl group content (%), by infrared spectroscopy.

These resins were tested in the form of magnetic coating compositions and magnetic recording media by the methods of evaluation described above for Examples 1 to 6. The results are also shown in Table 2.

TABLE 2

| | Example | | | | | Comparative Example | | | | | | | | |
|---|---|---|---|---|---|---|---|---|---|---|---|---|---|---|
| | 7 | 8 | 9 | 10 | 11 | 10 | 11 | 12 | 13 | 14 | 15 | 16 | 17 | 19 |
| Sample | P | Q | R | S | T | U | V | W | X | Y | Z | a | b | c |
| Properties of the copolymer | | | | | | | | | | | | | | |
| Composition (wt. %) | | | | | | | | | | | | | | |
| Vinyl chloride | 85.0 | 83.1 | 89.3 | 93.1 | 92.0 | 84.8 | 71.0 | 77.9 | 82.6 | 88.5 | 94.5 | 89.3 | 86.0 | 91.0 |
| Carboxyl group | 2.5 | 2.5 | 1.5 | 1.2 | 2.0 | 2.3 | 3.6 | 6.5 | 1.5 | 1.5 | 0.8 | 2.5 | 0.8 | — |
| Hydroxyl group | 1.8 | 1.5 | 1.0 | 0.4 | 0.7 | *$^1$1.6 | 2.7 | 1.5 | 1.8 | 1.1 | 0.5 | *$^2$1.8 | — | *$^2$2.3 |
| Vinyl acetate | — | — | — | 2.8 | — | — | — | — | — | — | — | 2.9 | 13.0 | 3 |
| Equivalent ratio of hydroxyl group to carboxyl group | 1.91 | 1.59 | 1.76 | 0.90 | 0.93 | 1.84 | 1.98 | 0.61 | 3.18 | 1.94 | 1.65 | 1.91 | — | — |
| Degree of polymerization | 260 | 420 | 390 | 390 | 280 | 430 | 330 | 210 | 350 | 170 | 950 | 360 | 430 | 450 |
| Properties of the magnetic coating composition or magnetic recording medium | | | | | | | | | | | | | | |
| Solubility | O | O | O | O | O | Δ | Δ | Δ | O | O | *$^3$Δ | O | O | O |
| Pot life (days) | 9 | 12 | 18 | 28 | 20 | 1 | 1 | 1 | 9 | 18 | — | 26 | >30 | 20 |
| Heat stability (hours) | 10 | 12 | 15 | 10 | 13 | 11 | 6 | 4 | 10 | 7 | 14 | 2 | 8 | 3 |
| Gloss (%) | 82 | 84 | 86 | 91 | 88 | 68 | 52 | 38 | 38 | 93 | No coating | 72 | 68 | 52 |
| Squareness ratio | 0.80 | 0.82 | 0.82 | 0.84 | 0.82 | 0.78 | 0.77 | 0.74 | 0.74 | 0.84 | composition | 0.78 | 0.77 | 0.77 |
| Durability | O | O | O | O | O | O | Δ | Δ | Δ | X | could be | O | Δ | X |
| Running property | O | O | O | O | O | O | O | X | Δ | X | prepared. | Δ | X | O |

*$^1$HO attached to the primary carbon (carbon containing 2 hydrogen atoms)
*$^2$Vinyl alcohol
*$^3$Dissolves under heat but gels upon cooling

What is claimed is:

1. In a magnetic coating composition for magnetic recording media in which a magnetic powder is dispersed in a vinyl chloride copolymer resin as a binder, the improvement which comprises as said binder a copolymer consisting of
   (1) at least 60% by weight of vinyl chloride units,
   (2) 0.3 to 5.0% by weight, as the carboxyl group, of monomer units containing a carboxyl group derived from a monomer selected from the group consisting of unsaturated monocarboxylic acids, unsaturated dicarboxylic acids and monoalkyl esters of unsaturated dicarboxylic acids,
   (3) 0.1 to 2.0% by weight, as the hydroxyl group, of monomer units containing the group -X-OH wherein X is selected from the group consisting of $C_nH_{2n}$, $OC_nH_{2n}$, $COOC_nH_{2n}$ and $CONHC_nH_{2n}$ wherein n is an integer of from 1 to 10, and
   (4) 1 to 20% by weight of units of another monomer derived for a monomer selected from the group consisting of vinyl ester of carboxylic acids, vinyl ethers, vinylidene halides, unsaturated carboxylic acid esters, olefins, unsaturated nitriles, styrene, alpha-methyl styrene and p-methyl styrene,
the equivalent ratio of the hydroxyl groups to the carboxylic groups being from 0.1 to 3.0.

2. The magnetic coating composition of claim 1 wherein in the monomer units containing the group —X—OH, OH is attached to the secondary carbon atom of X.

3. The magnetic coating composition of claim 1 wherein the vinyl chloride copolymer has a degree of polymerization of 200 to 900.

4. The magnetic coating composition of claim 1 wherein in the vinyl chloride copolymer the monomer units containing the group —X—OH are derived from a monomer selected from the group consisting of $C_2$–$C_{10}$ alkanol esters of alpha, beta-unsaturated acids, alkanol esters of unsaturated dicarboxylic acids, olefinic alcohols, alkanol vinyl ethers, and N-methylolacrylamide and N-methylolmethacrylamide.

5. The magnetic coating composition of claim 1 wherein the vinyl chloride copolymer resin consists of
   (1) at least 60% by weight of vinyl chloride units,
   (2) 0.3 to 5.0% by weight, as the carboxylic group, of monomer units containing a carboxyl group and being derived from a monomer selected from the group consisting of unsaturated monocarboxylic acids, unsaturated dicarboxylic acids, and monoalkyl esters of unsaturated dicarboxylic acids,
   (3) 0.1 to 2.0% by weight, as the hydroxyl group, of monomer units containing the group —X—OH wherein X is an organic group and which is derived from the monomer selected from the group consisting of $C_2$-$C_{10}$ alkanol esters of alpha, beta-unsaturated acids, alkanol esters of unsturated dicarboxylic acids, olefinic alcohols, alkanol vinyl ethers, and N-methylol(meth)acrylamides, and
   (4) 1 to 20% by weight of units of another monomer selected from the group consisting of vinyl esters of carboxylic acids, vinyl ethers, vinylidene halides, unsaturated carboxylic acid esters, olefins, unsaturated nitriles, styrene, alphamethyl styrene and p-methyl styrene.

6. The magnetic coating composition of claim 1 wherein the vinyl chloride copolymer consists of at least 60% by weight of vinyl chloride units, 0.3 to 5.0% by weight, as the carboxyl group, of monomer units derived from itaconic acid, 0.1 to 2.0% by weight, as the hydroxyl group, of monomer units derived from 2-hydroxyethyl methacrylate, and 1 to 20% by weight of units derived from vinyl acetate monomer, the equivalent ratio of the hydroxyl groups to the carboxyl groups being from 0.1 to 3.0.

7. The magnetic coating composition of claim 1 wherein the vinyl chloride copolymer includes from 1 to 15% by weight of the units of said other monomer (4).

8. The magnetic coating composition of claim 5 wherein the vinyl chloride copolymer contains from 1 to 15% by weight of the units of said other monomer (4).

9. The magnetic coating composition of claim 6 wherein the vinyl chloride copolymer contains from 1 to 15% by weight of units derived from said vinylacetate monomer.

10. The magnetic coating composition of claim 1 wherein the magnetic powder is Fe, Co, $\gamma$-$Fe_2O_3$, $Fe_3O_4$, Co-containing-$\gamma$-$Fe_2O_3$, Co-containing $Fe_3O_4$, barium ferrite or $CrO_2$.

* * * * *